United States Patent [19]
Riedel

[11] Patent Number: 5,742,601
[45] Date of Patent: Apr. 21, 1998

[54] ATM COMMUNICATIONS EQUIPMENT

[75] Inventor: Michael Riedel, Dresden, Germany

[73] Assignee: Siemens Aktiengesellschaft, Munich, Germany

[21] Appl. No.: 657,951

[22] Filed: Jun. 4, 1996

[30] Foreign Application Priority Data

Jun. 9, 1995 [DE] Germany ............ 195 21 069.7

[51] Int. Cl.$^6$ ............................ H04L 12/56
[52] U.S. Cl. ............ 370/395; 370/414; 370/468
[58] Field of Search ........................ 370/412, 413, 370/414, 415, 416, 417, 418, 395, 468, 535, 537, 542, 229, 231, 419, 420, 463

[56] References Cited

U.S. PATENT DOCUMENTS

| | | | |
|---|---|---|---|
| 5,280,475 | 1/1994 | Yanagi et al. | 370/428 |
| 5,287,349 | 2/1994 | Hyodo et al. | 370/413 |
| 5,361,255 | 11/1994 | Diaz et al. | 370/413 |
| 5,517,495 | 5/1996 | Lund et al. | 370/414 |

Primary Examiner—Douglas W. Olms
Assistant Examiner—Phirin Sam
Attorney, Agent, or Firm—Hill, Steadman & Simpson

[57] ABSTRACT

The ATM communications equipment unit comprises at its terminals input-side and output-side multiplex equipment units designed for a statistical multiplexing of message cells. Input queues, which can be individually allocated to the output-side multiplex equipment unit, are controlled in the input-side multiplex equipment unit for storing message cells to be transmitted. In addition, indications concerning the current usage of the bandwidth available at the respective terminal are respectively retained in these input-side and output-side multiplex equipment units. For the transmission of message cells from an input-side multiplex equipment unit to an allocated output-side multiplex equipment unit, a flow control is carried out such that a request message is respectively transmitted by the input-side multiplex equipment to the output-side multiplex equipment unit for a request of a determined bandwidth. If no free bandwidth is currently available at the output side, the individual request messages are inserted into a request queue that is processed as bandwidth becomes free. As bandwidth becomes free, a determined bandwidth is offered to the respective input-side multiplex equipment unit by means of an offer message. This offer message is acknowledged with an indication of the actually required bandwidth.

4 Claims, 1 Drawing Sheet

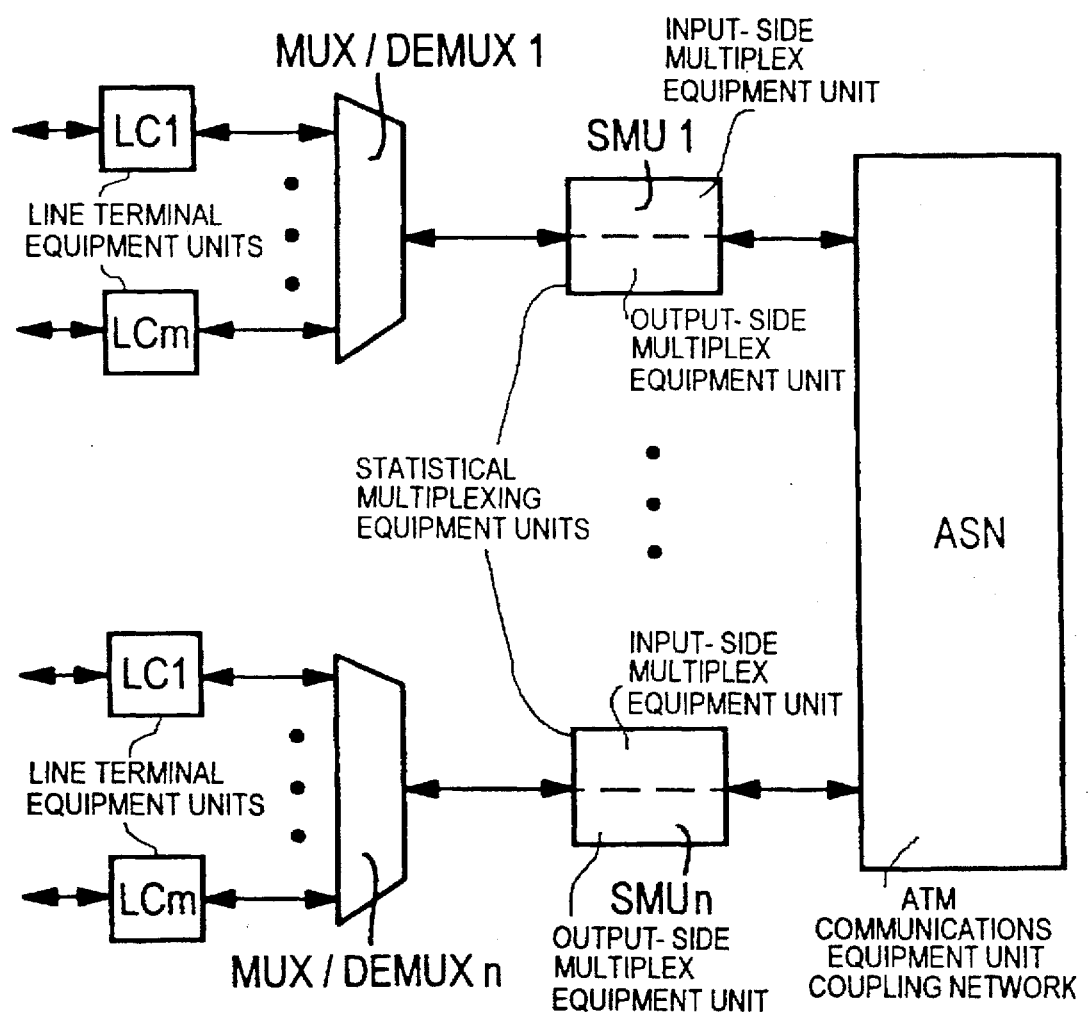

ATM COMMUNICATIONS EQUIPMENT

BACKGROUND OF THE INVENTION

The invention concerns ATM communications equipment. ATM communications equipment is already known from "Proceedings Vol. 1, ISS '95, World Telecommunication Congress," Berlin, 23–28 Apr. 1995, pages 273 to 277. In this known ATM communications equipment, request messages for requesting an allocation of output-side bandwidth, and which are entitled to a multiplex equipment unit at the output side by a multiplex equipment unit at the input side after an allocation of input-side bandwidth, are inserted into a request queue belonging to this output-side multiplex equipment unit, if no free bandwidth is currently available. The requested bandwidth thus remains reserved in the respective input-side multiplex equipment units. The request messages, stored at first, are then processed in the sequence in which they were received as bandwidth becomes free, by allocating an available bandwidth to the respective relevant input-side multiplex equipment unit.

SUMMARY OF THE INVENTION

An object of the present invention is to indicate a way in which ATM communications equipment can be constructed in order to optimize the flow control for the transmission of message cells with respect to the allocation of bandwidth for the individual input-side multiplex equipment unit connected with an output-side multiplex equipment unit.

According to the invention, a communications system is provided having an ATM communications equipment unit coupling network having terminals, a statistical multiplexing equipment unit being provided at each of the terminals for a statistical multiplexing of message cells, and wherein each statistical multiplexing equipment unit has an input-side multiplex equipment unit and an output-side multiplex equipment unit. Input. queues individually allocated to the output-side multiplex equipment unit for storing of message cells to be transmitted are respectively controlled in the individual input-side multiplex equipment unit. Indications concerning current usage of a bandwidth available at a respective terminal are respectively retained at the input-side multiplex equipment unit and the output-side multiplex equipment unit. For transmission of message cells by an input-side multiplex equipment unit to an output-side multiplex equipment unit allocated thereto, a flow control is carried out in such a way that, given an exceeding of at least one determined threshold of an occupancy level by an input queue of the relevant input-side multiplex equipment unit, the queue being allocated to the relevant output-side multiplex equipment unit, after an allocation of an input-side bandwidth an request message is transmitted to the relevant output-side multiplex equipment unit. By this, an output-side bandwidth corresponding to the bandwidth allocated to the input-side is granted for processing of the relevant input queue. If a free output-side bandwidth is not available, the request message is inserted into a request queue controlled in the relevant output-side multiplex equipment unit. After the processing of an input queue allocated to the relevant output-side multiplex equipment unit by the input-side multiplex equipment unit associated with this input queue, the bandwidth previously occupied at the input-side by this input queue is released and a cleardown message is transmitted to the relevant output-side multiplex equipment unit, by means of which a releasing of the bandwidth occupied for this input queue up to this point is indicated. With a freeing of output-side bandwidth, given presence of a request queue occupied by at least one request message, an offer message is first sent by the relevant output-side multiplex equipment unit to that input-side multiplex equipment unit that previously emitted the currently pending request message for processing. Indications concerning the output-side bandwidth to be made available are contained in the offer message, and a confirmation message is transmitted back by the relevant input-side multiplex equipment unit containing indications concerning the actually claimed output-side bandwidth.

The invention has the advantage that, by means of an output-side multiplex equipment unit in which a not-yet-processed request message (i.e. one that is retained in the associated request queue) for an input-side multiplex equipment unit is present, the bandwidth requested by means of this request message is not immediately allocated as bandwidth becomes free, but rather an offer message for the claiming of a bandwidth that is already available is first supplied to the relevant input-side multiplex equipment unit. By means of the relevant input-side multiplex equipment unit, it can then be decided which bandwidth is actually still needed at the time of the reception of the offer message, taking into account the current traffic load, which can be determined e.g. by monitoring the occupancy level of the input queue to be processed. In this way, an unnecessarily high supplying of bandwidth for an input-side multiplex equipment unit, and thereby a blocking of bandwidth for the remaining input-side multiplex equipment unit, is hindered, if the traffic load conditions in the relevant input-side multiplex equipment unit changes in the time interval between the emitting of a request message and the becoming free of bandwidth. Thus a bandwidth just becoming free can, if necessary, be assigned proportionately to a plurality of input-side multiplex equipment unit by means of an output-side multiplex equipment unit.

Advantageous embodiments of an ATM communications equipment system according to the present invention are disclosed. In an embodiment of the invention where named flow control signals are transmitted between the input-side multiplex equipment unit and the output-side multiplex equipment unit in the form of separately identified message cells together with the remaining message cells, a low control expense for the transmission of the flow control messages results, and the possibility of ensuring a sufficient bandwidth for real-time message cell streams as well as a dynamic allocation of bandwidth for message cell streams to be transmitted according to a statistical multiplex method is provided. In another embodiment of the invention where the reception of a request message in the request queue of the relevant output-side multiplex equipment unit is acknowledged to the relevant input-side communications equipment unit by means of a confirmation message transmitted to this equipment unit through the immediate acknowledgment of a request message contained in a request queue in the respective input-side multiplex equipment unit, an input-side bandwidth corresponding to the requested output-side bandwidth for the relevant input queue can first be released. The input-side bandwidth that has become free can thereby be allocated to other input queues.

BRIEF DESCRIPTION OF THE DRAWING

A communications system by the invention is shown in the block diagram of the drawing FIGURE.

DESCRIPTION OF THE PREFERRED EMBODIMENTS

A communications system operating according to an asynchronous transfer mode (ATM) is represented in the drawing, which has access to a coupling network ASN as a central equipment unit. This coupling network may, for example, be a switching node designed for virtual connections or a node for fixed lines, which is also designated "cross connect." An equipment unit for a statistical multiplexing is connected to respective bidirectional terminals of the coupling network ASN, designated 1, ..., n. These equipment units, designated SMU1, ... SMUn in correspondence with their allocation to the individual terminals, are so designed in the present exemplary embodiment that these respectively forward a message cell stream, coming in via a transmission line, to the coupling network ASN according to a statistical multiplexing principle, and on the other hand emit a message cell stream supplied from this network as an outgoing message cell stream to the respective transmission line. In the present exemplary embodiment, the individual transmission lines are respectively terminated with multiplex equipment units, which combine message cell streams supplied in the standard way via individual transmission lines into respective multiplex message cell streams, or, respectively, partition such a multiplex message cell stream to these individual lines. These multiplex equipment units, designated MUX/DEMUX1, ..., MUX/DEMUXn in correspondence with their allocation to the equipment units SMU1, ..., SMUn, are connected for this purpose with line terminal equipment units LC1, ..., LCm on the side of the individual lines; individual subscriber equipment units can, for example, be connected to the terminal equipment units.

In the present exemplary embodiment, the equipment units SMU1, ..., SMU have branches individually allocated to both directions of transmission. The two branches are designated below as the input-side multiplex equipment unit and the output-side multiplex equipment unit. Buffers are thereby provided in the input-side multiplex equipment unit. In these buffers the message cells received are intermediately stored before forwarding to the coupling network ASN. Logical input queues are respectively controlled in these buffers. These queues can be individually allocated to the individual terminals of the coupling network ASN in the output direction, and thus to the named output-side multiplex equipment unit. The message cells received by the respective input-side multiplex equipment unit are inserted into these logical input queues in dependence on their destination. The respective destinations thereby result in a known way from the identification, respectively attached to the individual message cells, for the respective virtual connection VC or virtual path connection VP. Since the structure of message cells, and in particular the meaning of the control messages controlled in such a message cell, into which category the connection identification just mentioned also falls, is generally known, in the following it is not discussed in more detail.

The named terminals of the coupling network ASN are respectively designed for a determined maximum bandwidth, i.e. maximum transmission bit rate. The management of this bandwidth, and thereby its partitioning to the individual message cell streams to be supplied to the coupling network ASN conducted away, occurs by means of the respective input-side or output-side multiplex equipment unit.

A flow control, explained in more detail below, is provided for the forwarding of the message cells contained in the individual logical input queues.

It is assumed for the sake of example that message cells from a plurality of input-side multiplex equipment units are to be transmitted to the same destination, i.e. to one and the same output-side multiplex equipment unit. As already mentioned previously, a determined bandwidth, i.e. a determined maximum transmission bit rate, is available to this output-side multiplex equipment unit for the reception of message cells. This bandwidth is at first proportionally allocated to the named plurality of input-side multiplex equipment units.

The logical input queues respectively concerned in the input-side multiplex equipment unit are processed according to the allocated bandwidth. If the occupancy level of such a logical input queue exceeds a determined threshold value due to an increased traffic load, it is first checked by means of the associated input-side multiplex equipment unit whether a free bandwidth is available at the input side. If this is the case, a maximum of one input-side bandwidth corresponding to the threshold value is allocated to the relevant input queue. A request message is subsequently transmitted by the respective input-side multiplex equipment unit to the output-side multiplex equipment unit allocated to this logical input queue, by which a corresponding output-side bandwidth is requested. For this purpose, corresponding bandwidth indications are contained in the request message. In response to this request message, a confirmation message is transmitted by the output-side multiplex equipment unit in the opposite direction, i.e. to the respective input-side multiplex equipment unit, containing indications concerning the output-side bandwidth allocated on the basis of the request message. The processing of the relevant logical input queue is then matched correspondingly to the bandwidth now available.

The output-side bandwidth made available on the basis of a request message from the output-side multiplex equipment unit can be lower than the bandwidth requested by this request message. In the extreme case, the value for an allocated bandwidth can be "0," so that the transmitted confirmation message mentioned above represents a negative acknowledgment. A request message confirmed with such a negative acknowledgment is inserted into a request queue in the output-side multiplex equipment unit, which queue is processed according to the FIFO principle as output-side bandwidth becomes free.

If a logical input queue is completely processed in an input-side multiplex equipment unit, i.e. an empty logical input queue is present, the previously engaged input-side bandwidth is released by the relevant input-side multiplex equipment unit, and a cleardown message is transmitted to the allocated output-side multiplex equipment unit, by means of which the output-side bandwidth originally made available for this logical input queue is likewise released. This releasing is acknowledged by the output-side multiplex equipment unit by means of a confirmation message transmitted in the opposite direction. In addition, one or several request messages present in the above-mentioned request queue of the output-side multiplex equipment unit are processed on the basis of the output-side bandwidth that has now become free, according to its size. This occurs in that an offer message is sent to the input-side multiplex equipment unit allocated to the request message next due for a processing, by means of which offer message an output-side bandwidth corresponding to the bandwidth that has become free is offered to this input-side multiplex equipment unit for the processing of the relevant logical input queue. This offered bandwidth can thereby correspond e.g. to the originally requested bandwidth. It is then checked in the relevant input-side multiplex equipment which portion of the offered bandwidth is actually required, with regard to the current traffic load and the bandwidth present at the input side. The claimed output-side bandwidth is thereby communicated to the output-side multiplex equipment unit by means of a confirmation message. If the bandwidth that has previously become free at the output side is not yet exhausted by the bandwidth just claimed, the control processes are correspondingly repeated for the next request message in the request queue.

In the present exemplary embodiment, the above-mentioned request, cleardown and offer messages, as well as the confirmation messages, are inserted into the message cell streams to be transmitted between the input-side and output-side multiplex equipment units as separately identified message cells.

In addition, it is to be pointed out that the above-named output-side multiplex equipment unit are respectively constructed so that by their means there is realized what is called a shaping function, in that the forwarding of message cells occurs in a manner corresponding to the traffic parameters determined for the individual virtual connections. In addition, it is provided in the present exemplary embodiment that the input-side and the output-side multiplex equipment units respectively reserve a part of the maximum available bandwidth for real-time connections, and only the remaining bandwidth is incorporated into a previously described flow control. Moreover, the previously explained flow control can also be modified so that for the previously named logical input queues a plurality of threshold values can also be determined respectively for the occupancy level, and, if warranted, a bandwidth corresponding to the respective threshold value is requested by means of a request message.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for operating a communications system having an ATM communications equipment unit coupling network with terminals, and wherein a statistical multiplexing equipment unit is provided at each of the terminals for a statistical multiplexing of message cells, and wherein each statistical multiplexing equipment unit has an input-side multiplex equipment unit and an output-side multiplex equipment unit, comprising the steps of:

respectively controlling in the individual input-side multiplex equipment units input queues for storing of message cells to be transmitted, the queues being individually allocated to respective output-side multiplex equipment units, and respectively retaining in the input-side multiplex equipment units and the output-side multiplex equipment units indications concerning current usage of a bandwidth available at respective terminals;

for transmission of message cells by an input-side multiplex equipment unit to an output-side multiplex unit allocated thereto, carrying out a flow control such that, given an exceeding of at least one determined threshold of an occupancy level by an input queue of the respective input-side multiplex equipment unit, which queue is allocated to the respective output-side multiplex equipment unit, after an allocation of an input-side bandwidth an request message is transmitted to the respective output-side multiplex equipment unit by means of which an output-side bandwidth corresponding to the bandwidth allocated to the input-side multiplex equipment unit is requested for processing of the respective input queue;

if a free output-side bandwidth is not available, inserting the request message into a request queue controlled in the respective output-side multiplex equipment unit;

after the processing of an input queue allocated to the respective output-side multiplex equipment unit by the input-side multiplex equipment unit associated with said input queue, releasing the bandwidth previously occupied at the input-side by this input queue and transmitting a cleardown message to the respective output-side multiplex equipment unit for indicating a releasing of the bandwidth occupied for this input queue up to this point;

with the respective output-side multiplex equipment unit becoming free of an output-side bandwidth given presence of a request queue occupied by at least one request message, first sending an offer message by the respective output-side multiplex equipment unit to the input-side multiplex equipment unit that previously emitted a currently pending request message for processing; and providing in the offer message indications concerning output-side bandwidth to be made available, and transmitting a confirmation message back by the respective input-side multiplex equipment unit providing indications concerning actually claimed output-side bandwidth.

2. A method according to claim 1 including the step of transmitting named flow control signals between the input-side and the output-side multiplex equipment units in the form of separately identified message cells together with remaining message cells.

3. A method according to claim 1 including the step of acknowledging the reception of a request message in the request queue of the respective output-side multiplex equipment unit to the respective input-side multiplex equipment unit by a confirmation message transmitted thereto.

4. A method according to claim 1 including the step of reserving a part of total available bandwidth by the input-side multiplex equipment unit and the output-side multiplex equipment unit for real-time traffic, and taking into account for flow control only a remaining part of the bandwidth.

* * * * *